(12) United States Patent
Reid et al.

(10) Patent No.: US 11,649,057 B2
(45) Date of Patent: May 16, 2023

(54) STATIC PLATE HEATING ARRANGEMENT

(71) Applicant: Rosemount Aerospace Inc., Burnsville, MN (US)

(72) Inventors: Alexander N. Reid, St. Louis Park, MN (US); Nathan Allan Hoffmann, Burnsville, MN (US); William B. Krueger, Bloomington, MN (US); Brian Alan Gilkison, Shakopee, MN (US); Robert J. Johnson, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 267 days.

(21) Appl. No.: 16/714,064

(22) Filed: Dec. 13, 2019

(65) Prior Publication Data

US 2021/0179277 A1 Jun. 17, 2021

(51) Int. Cl.
*B64D 15/12* (2006.01)
*B64D 15/22* (2006.01)
*H05B 3/00* (2006.01)

(52) U.S. Cl.
CPC ............. *B64D 15/12* (2013.01); *B64D 15/22* (2013.01); *H05B 3/0019* (2013.01)

(58) Field of Classification Search
CPC ................................ B64D 15/12; B64D 15/22
See application file for complete search history.

(56) References Cited

U.S. PATENT DOCUMENTS

| 3,082,622 A | 3/1963 | Andrew |
| 3,208,277 A | 9/1965 | Hays, Jr. |
| 3,400,582 A | 9/1968 | Warner |
| 3,514,997 A | 6/1970 | Gwathmey et al. |
| 3,534,600 A | 10/1970 | Eichweber et al. |
| 3,604,259 A | 9/1971 | Heinsohn et al. |
| 3,665,760 A | 5/1972 | Pitches et al. |
| 3,882,721 A | 5/1975 | Neary et al. |
| 4,230,290 A | 10/1980 | Townsend et al. |
| 4,390,950 A | 6/1983 | Muller |
| 4,458,137 A | 7/1984 | Kirkpatrick |
| 4,468,961 A | 9/1984 | Berg |

(Continued)

FOREIGN PATENT DOCUMENTS

| CA | 2717927 A1 | 4/2011 |
| CA | 2745138 A1 | 1/2012 |

(Continued)

OTHER PUBLICATIONS

Extended European Search Report for European Patent Application No. 20213883.0, dated Apr. 23, 2021, 9 pages.

(Continued)

*Primary Examiner* — Michael H Wang
(74) *Attorney, Agent, or Firm* — Kinney & Lange, P.A.

(57) ABSTRACT

A static plate heating arrangement includes a faceplate including a port extending from an exterior surface of the faceplate to an interior surface of the faceplate, a fixed resistance heater in thermal communication with the interior surface and surrounding the port, and a self-regulating heater in thermal communication with the interior surface and surrounding the fixed resistance heater. The fixed resistance heater and the self-regulating heater are electrically connected in series.

16 Claims, 6 Drawing Sheets

(56) References Cited

U.S. PATENT DOCUMENTS

| | | | |
|---|---|---|---|
| 4,830,164 A | 5/1989 | Hays | |
| 4,901,566 A | 2/1990 | Boetsch et al. | |
| 5,025,661 A | 6/1991 | Mccormack | |
| 5,062,869 A * | 11/1991 | Hagen | G01P 5/165 96/420 |
| 5,115,237 A | 5/1992 | Greene | |
| 5,322,246 A | 6/1994 | Henne et al. | |
| 5,438,865 A * | 8/1995 | Greene | G01P 13/025 73/180 |
| 5,442,958 A | 8/1995 | Hagen | |
| 5,466,067 A | 11/1995 | Hagen et al. | |
| 5,628,565 A | 5/1997 | Hagen et al. | |
| 6,070,475 A | 6/2000 | Muehlhauser et al. | |
| 6,076,963 A | 6/2000 | Menzies et al. | |
| 6,510,740 B1 | 1/2003 | Behm et al. | |
| 6,561,006 B1 | 5/2003 | Roberge et al. | |
| 6,672,152 B2 * | 1/2004 | Rouse | G01P 5/14 73/170.01 |
| 6,813,942 B1 | 11/2004 | Vozhdaev et al. | |
| 6,845,658 B2 | 1/2005 | Roberge et al. | |
| 6,918,294 B1 | 7/2005 | Roberge | |
| 6,941,805 B2 | 9/2005 | Seidel et al. | |
| 7,186,951 B2 | 3/2007 | Zippold et al. | |
| 7,401,507 B2 | 7/2008 | Collot et al. | |
| 7,597,018 B2 | 10/2009 | Braun et al. | |
| 7,748,268 B2 | 7/2010 | Lull et al. | |
| 8,397,565 B1 | 3/2013 | Dillon et al. | |
| 9,752,945 B2 | 9/2017 | Hedtke et al. | |
| 10,179,654 B2 | 1/2019 | Anderson et al. | |
| 10,197,588 B2 | 2/2019 | Wong et al. | |
| 10,393,766 B2 * | 8/2019 | Alcaya | G01P 13/025 |
| 10,877,062 B2 * | 12/2020 | Reid | G01P 5/165 |
| 10,928,416 B2 * | 2/2021 | Reid | B64D 15/12 |
| 2003/0115948 A1 | 6/2003 | Rouse et al. | |
| 2004/0188945 A1 | 9/2004 | Poincet et al. | |
| 2004/0261518 A1 | 12/2004 | Seidel et al. | |
| 2010/0116806 A1 | 5/2010 | Hollingsworth et al. | |
| 2011/0208375 A1 | 8/2011 | Spoerry et al. | |
| 2015/0082878 A1 | 3/2015 | Bigand | |
| 2015/0110149 A1 | 4/2015 | Begin-Drolet et al. | |
| 2015/0122797 A1 | 5/2015 | Eggers | |
| 2015/0344137 A1 * | 12/2015 | Bartz | B64D 15/14 219/494 |
| 2016/0033356 A1 | 2/2016 | DeAngelo et al. | |
| 2016/0114883 A1 | 4/2016 | Guerry et al. | |
| 2016/0356175 A1 | 12/2016 | Waddington | |
| 2017/0199218 A1 | 7/2017 | Benning | |
| 2017/0273144 A1 * | 9/2017 | Caillot | H05B 1/0236 |
| 2018/0079525 A1 | 3/2018 | Krueger et al. | |
| 2018/0136249 A1 | 5/2018 | Krueger et al. | |
| 2019/0056424 A1 | 2/2019 | Alcaya et al. | |
| 2019/0056425 A1 * | 2/2019 | Reid | G01P 13/025 |
| 2019/0100327 A1 | 4/2019 | Krueger et al. | |
| 2019/0210734 A1 | 7/2019 | Whalen | |
| 2019/0242924 A1 | 8/2019 | Lang et al. | |
| 2019/0301949 A1 | 10/2019 | Gordon et al. | |
| 2019/0346478 A1 | 11/2019 | Reid et al. | |
| 2019/0346479 A1 | 11/2019 | Reid | |
| 2020/0309630 A1 * | 10/2020 | Gilkison | G01L 19/06 |

FOREIGN PATENT DOCUMENTS

| | | |
|---|---|---|
| CN | 103410682 A | 11/2013 |
| CN | 104034301 A | 9/2014 |
| CN | 105142246 A | 12/2015 |
| CN | 106628206 A | 5/2017 |
| CN | 107687350 A | 2/2018 |
| CN | 107843249 A | 3/2018 |
| DE | 102008007469 A1 | 8/2009 |
| DE | 202014105763 U1 | 2/2016 |
| EP | 212167 A2 | 3/1987 |
| EP | 212167 A3 | 11/1987 |
| EP | 1319863 A1 | 6/2003 |
| EP | 0932831 B1 | 2/2004 |
| EP | 1844863 A1 | 10/2007 |
| EP | 1980860 A2 | 10/2008 |
| EP | 2950106 A1 | 12/2015 |
| EP | 2980589 A1 | 2/2016 |
| EP | 3012187 A1 | 4/2016 |
| EP | 3056884 A1 | 8/2016 |
| EP | 3413025 A1 | 12/2018 |
| EP | 3567375 A1 | 11/2019 |
| EP | 3567376 A1 | 11/2019 |
| GB | 2039676 A | 8/1980 |
| SE | 541696 C2 | 11/2019 |
| WO | 9010492 A1 | 9/1990 |
| WO | 03027654 A2 | 4/2003 |
| WO | 03087847 A1 | 10/2003 |
| WO | 2006121321 A1 | 11/2006 |

OTHER PUBLICATIONS

Extended European Search Report dated Jul. 10, 2020, issued during the prosecution of European Patent Application No. EP 19213954.1.

Extended European Search Report for European Patent Application No. 19173355.9, dated Sep. 11, 2019, 12 pages.

Extended European Search Report for European Patent Application No. 19173361.7, dated Sep. 11, 2019, 11 pages.

Extended European Search Report for European Patent Application No. 18215700.8 dated May 20, 2019, 9 pages.

EP Communcation pursuant to article 94(3) EPC for App 18215700.8 dated Jul. 8, 2020.

Extended European Search Report for European Patent No. 19216057.0, dated Jul. 8, 2020, 10 pages.

Extended European Search Report for European Patent Application No. 18189469.2, dated Jan. 21, 2019, 7 pages.

Extended European Search Report for European Patent Application No. 18189477.5, dated Jan. 21, 2019, 10 pages.

Extended European Search Report for European Patent Application No. 18189480.9, dated Mar. 6, 2019, 10 pages.

Extended European Search Report for European Patent Application No. 20159881.0, dated Jun. 15, 2020, 5 pages.

Communication pursuant to Article 94(3) EPC for European Patent Application No. 18189480.9, dated Nov. 11, 2019, 4 pages.

Extended European Search Report for European Patent Application No. 21209813.1, dated Mar. 29, 2022, 6 pages.

* cited by examiner

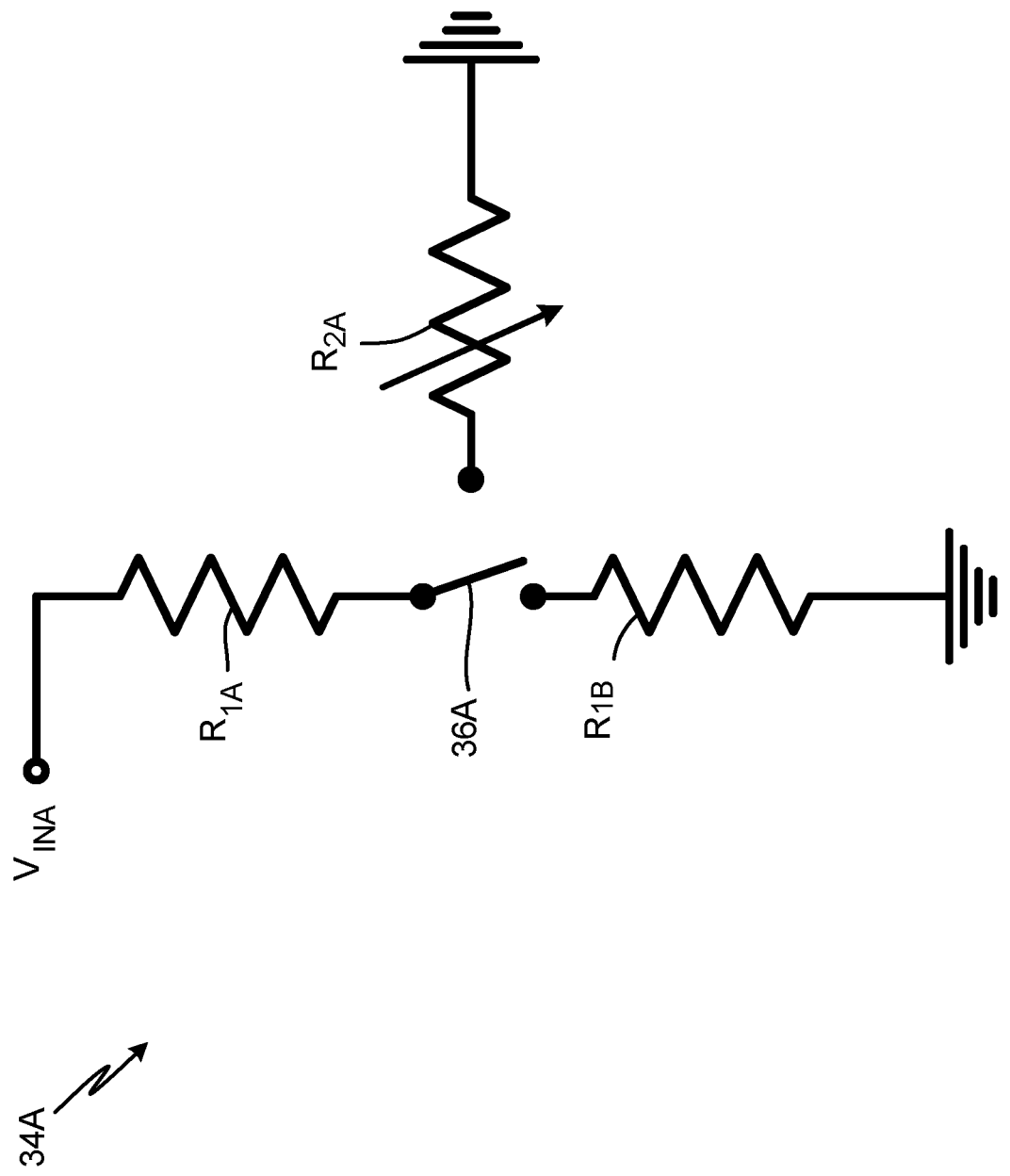

STATIC PLATE HEATING ARRANGEMENT

BACKGROUND

The present disclosure relates generally to air data probes, and in particular, to flush static plates.

Flush static plates measure pressure at the outer mold line of an aircraft to generate air data parameters. Flush static plates have faceplates with external surfaces in line with the aircraft outer mold line in order to minimize flow disruption. Thus, flush static plates are exposed to the environmental conditions exterior to the aircraft, which are often cold. As such, heaters are utilized within flush static plates to remove and prevent ice accumulation during flight operation and ensure the flush static plates function properly in liquid water, ice crystal, and mixed phase icing conditions. It can be difficult to heat flush static plates using power levels as are typically provided by the aircraft.

SUMMARY

A static plate heating arrangement includes a faceplate including a port extending from an exterior surface of the faceplate to an interior surface of the faceplate, a fixed resistance heater in thermal communication with the interior surface and surrounding the port, and a self-regulating heater in thermal communication with the interior surface and surrounding the fixed resistance heater. The fixed resistance heater and the self-regulating heater are electrically connected in series.

A method of heating a static plate includes positioning a fixed resistance heater to be in thermal communication with an interior surface of a faceplate of the static plate and surround a port in the faceplate, positioning a self-regulating heater to be in thermal communication with the interior surface of the faceplate and surround the fixed resistance heater, and causing current to flow through the fixed resistance heater and the self-regulating heater in series.

BRIEF DESCRIPTION OF THE DRAWINGS

FIG. 6 is a schematic view of circuitry of the second embodiment of the flush static plate.

DETAILED DESCRIPTION

In general, the present disclosure describes a heating arrangement for a flush static plate that has an outer self-regulating annular heater surrounding an inner fixed resistance heater, which are electrically connected in series; low thermal conductivity mounts; and annular gaps to increase power efficiency and reliability and reduce system complexity while removing entrapped moisture and maintaining an ice-free area.

Figure 1:
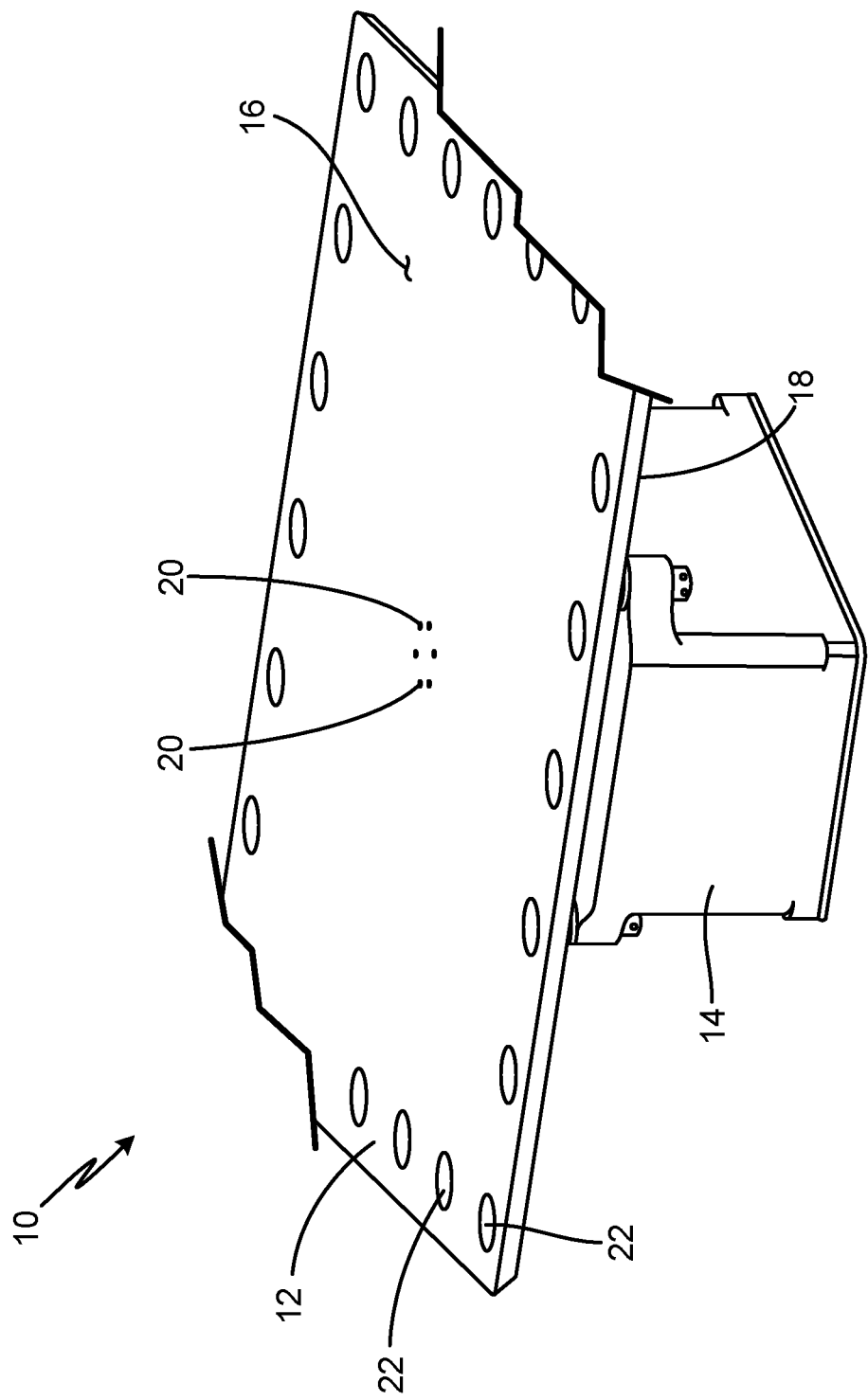
FIG. 1 is a partial perspective view of a flush static plate.

FIG. 1 is a partial perspective view of flush static plate 10. Flush static plate 10 includes faceplate 12 and housing 14. Faceplate 12 includes exterior surface 16, interior surface 18, ports 20, and mounting holes 22.

Flush static plate 10 has faceplate 12 connected to housing 14. Housing 14 is connected to a central portion of faceplate 12. Internal components of flush static plate 10 are located within housing 14, such as a transducer. Faceplate 12 has exterior surface 16 at an outer surface of faceplate 12 and an interior surface 18 at an inner surface of faceplate 12. Housing 14 is connected to interior surface 18 of faceplate 12 via mounts (shown in FIGS. 2 and 3). Ports 20 extend through a central portion of faceplate 12 from exterior surface 16 to interior surface 18. Ports 20 are in alignment with housing 14. In this embodiment, faceplate 12 has six ports 20. In alternate embodiments, faceplate 12 may have any number of ports 20. Mounting holes 22 extend through faceplate 12 from exterior surface 16 to interior surface 18. Mounting holes 22 are positioned near a periphery of faceplate 12 such that mounting holes 22 surround ports 20.

Flush static plate 10 is configured to be installed on an aircraft. Flush static plate 10 may be mounted to a fuselage of an aircraft via mounting holes 22 on faceplate 12 and fasteners, such as screws or bolts. Exterior surface 16 of faceplate 12 is in line with, or flush with, the outer mold line of the aircraft to minimize flow disruption. Housing 14 extends within aircraft. Flush static plate 10 measures static pressure at exterior surface 16 via ports 20 and communicates air pressures pneumatically through internal components of flush static plate 10. Pressure measurements are communicated to a flight computer and can be used to generate air data parameters related to the aircraft flight condition.

Figure 2:
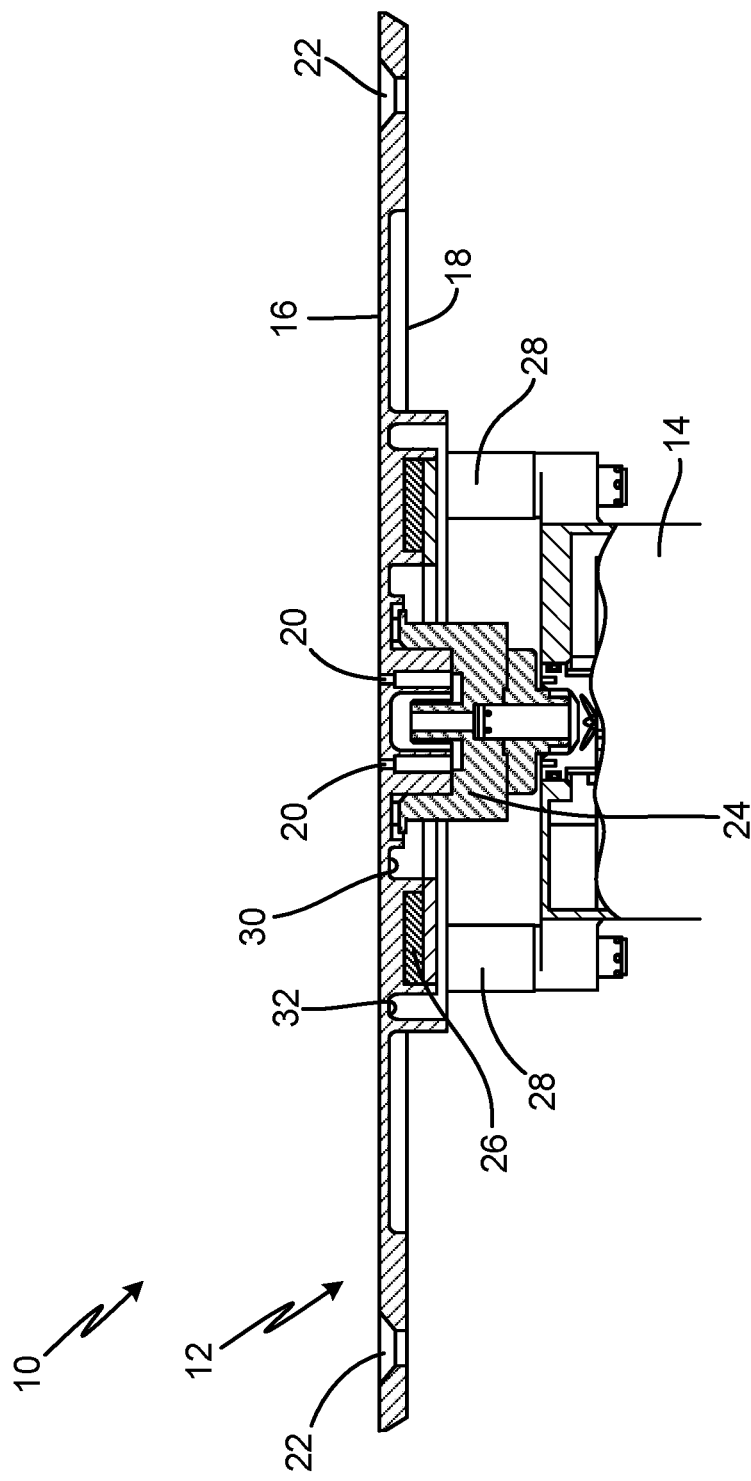
FIG. 2 is a partial cross-sectional side view of the flush static plate.
Figure 3:
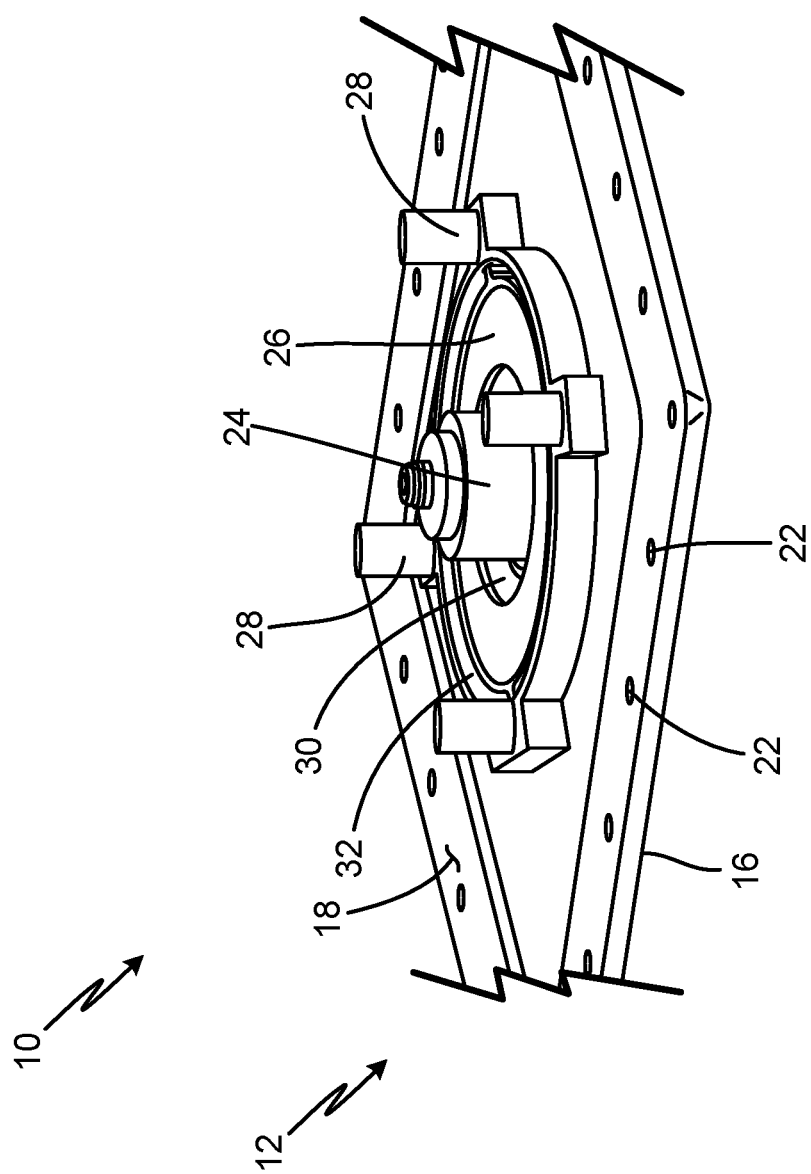
FIG. 3 is a partial isometric view of an interior side of the flush static plate with the housing removed.

FIG. 2 is a partial cross-sectional side view of flush static plate 10. FIG. 3 is a partial isometric view of an interior side of flush static plate 10 with housing 14 removed. FIGS. 2 and 3 will be discussed together. Flush static plate 10 includes faceplate 12, housing 14 (shown in FIG. 2), fixed resistance heater 24, self-regulating heater 26, and mounts 28. Faceplate 12 includes exterior surface 16, interior surface 18, ports 20, mounting holes 22, inner annular gap 30, and outer annular gap 32.

Flush static plate 10 has the same structure and function as described with respect to FIG. 1. Flush static plate 10 has faceplate 12 connected to housing 14. Faceplate 12 is made of thermally conductive material, such as aluminum or titanium. Faceplate 12 may be made of material having a thermal conductivity in the range of the thermal conductivity of titanium to the thermal conductivity of copper. Housing 14 is connected to a central portion of faceplate 12. Internal components of flush static plate 10 are located within housing 14. Faceplate 12 has exterior surface 16 at an outer surface of faceplate 12 and an interior surface 18 at an inner surface of faceplate 12. Housing 14 is connected to interior surface 18 of faceplate 12. Ports 20 are passages that extend through a central portion of faceplate 12 from exterior surface 16 to interior surface 18. Ports 20 are in alignment with housing 14. Mounting holes 22 extend through faceplate 12 from exterior surface 16 to interior surface 18. Mounting holes 22 are positioned near a periphery of faceplate 12.

As seen in FIGS. 2 and 3, flush static plate 10 has fixed resistance heater 24 with a first end connected to and in thermal communication with interior surface 18 of faceplate 12 adjacent ports 20. Fixed resistance heater 24 surrounds a portion of faceplate 12. As such, fixed resistance heater surrounds interior portions of ports 20, which extend through faceplate 12 within fixed resistance heater 24. A second end of fixed resistance heater 24 is connected to housing 14. Fixed resistance heater 24 is a constant resistance heater. The first end of fixed resistance heater 24 is electrically connected to self-regulating heater 26. Self-regulating heater 26 is connected to and in thermal communication with interior surface 18 of faceplate 12. Self-regulating heater 26 is annular such that self-regulating heater 26 is spaced from and surrounds fixed resistance heater 24. Self-regulating heater 26 is a ceramic self-regulating heater, such as a positive temperature coefficient resistive heater. For example, self-regulating heater 26 automatically increases resistance to limit power output after reaching a certain temperature. Self-regulating heater 26 may also be a thermostatically-controlled heater or a heater self-regulated by any other suitable method. Mounts 28 are positioned between interior surface 18 of faceplate 12 and housing 14. Housing 14 is connected to interior surface 18 of faceplate 12 via mounts 28. Mounts 28 are adjacent a periphery of self-regulating heater 26. Mounts 28 are formed of a low thermal conductivity material. Mounts 28 may be formed of one or more of steel, titanium, plastic, composite, or any other suitable low thermal conductivity material. In this embodiment, flush static plate 10 has four mounts 28. In alternate embodiments, flush static plate 10 may have any number of mounts 28.

Faceplate 12 has inner annular gap 30, which is a space extending into faceplate 12 from interior surface 18 of faceplate 12 between fixed resistance heater 24 and self-regulating heater 26. Thus, faceplate 12 has a decreased thickness at inner annular gap 30. Inner annular gap 30 surrounds fixed resistance heater 24. Inner annular gap 30 extends into faceplate beyond fixed resistance heater 24 such that inner annular gap 30 is closer to exterior surface 16 of faceplate than fixed resistance heater 24. Inner annular gap 30 may have a uniform width. Outer annular gap 32 is a space that extends into faceplate 12 from interior surface 18 of faceplate 12 such that outer annular gap 32 surrounds self-regulating heater 26. Thus, faceplate 12 has a decreased thickness at outer annular gap 32, and self-regulating heater 26 is positioned between inner annular gap 30 and outer annular gap 32. Outer annular gap 22 may have a uniform width.

Flush static plate 10 is installed on an aircraft and exposed to external airflow, which may contain water and/or ice particles. Fixed resistance heater 24 and self-regulating heater 26 provide heat to flush static plate 10 to prevent and remove ice accumulation. Fixed resistance heater 24 also removes moisture that enters ports 20 during flight or when grounded. Upon start-up, heat from fixed resistance heater 24 is provided to ports 20 to bake out (or burn off or boil out) water that is ingested when the aircraft is grounded (or in flight) that would otherwise remain in ports 20 and block the pressure path within flush static plate 10.

As the temperature of self-regulating heater 26 increases, the resistance of self-regulating heater 26 increases after a certain temperature has been reached, or set-point temperature (as defined by the self-regulating design), which reduces the amount of power consumed by both self-regulating heater 26 and fixed resistance heater 24. As the temperature of self-regulating heater 26 decreases below the set-point temperature, the resistance of self-regulating heater 26 decreases, which increases the amount of power consumed by both self-regulating heater 26 and fixed resistance heater 24. Self-regulating heater 26 utilizes an automatic shut-off. When self-regulating heater 26 reaches a certain temperature, or certain set-point, self-regulating heater 26 increases its resistance to choke the power draw of self-regulating heater 26 and fixed resistance heater 24 of flush static plate 10. The set-point may be in a range of about 80 degrees Celsius to about 130 degrees Celsius.

Because faceplate 12 is made from thermally conductive material, faceplate 12 is thermally conductive. Mounts 28, inner annular gap 30, and outer annular gap 32 keep heat at a center portion of aluminum faceplate 12. Mounts 28 are made of low thermal conductivity material to minimize heat loss through mounts 28. Inner annular gap 30 and outer annular gap 32 minimize heat loss to faceplate 12 via conduction. Inner annular gap 30 prevents heat from fixed resistance heater 24 from moving beyond inner annular gap 30, or keeps heat in the center of faceplate 12. Inner annular gap 30 extends closer to exterior surface 16 of faceplate than fixed resistance heater 24 to better prevent heat loss to faceplate 12. Outer annular gap 32 prevents heat from fixed resistance heater 24 and self-regulating heater 26 from moving beyond outer annular gap 32, or keeps heat in the center of faceplate 12. As such, inner annular gap 30 and outer annular gap 32 are features that decrease heat transfer radially across inner annular gap 30 and outer annular gap 32, respectively, providing thermal separation for fixed resistance heater 24 and self-regulating heater 26. Inner annular gap 30 and outer annular gap 32 define decreased thickness of faceplate 12 to prevent heat loss beyond inner annular gap 30 and outer annular gap 32.

Fixed resistance heater 24 and self-regulating heater 26 provide anti-icing and moisture management of flush static plate 10 to ensure flush static plate 10 functions properly. Self-regulating heater 26 is spaced from fixed resistance heater 24 so that self-regulating heater 26 effectively chokes the power draw at the desired temperature.

Mounts 28, inner annular gap 30, and outer annular gap 32 keep heat at a center portion of aluminum faceplate 12, such as at ports 20, to minimize heat loss from fixed resistance heater 24 and self-regulating heater 26 to faceplate 12, housing 14, and other areas of flush static plate 10. Thus, heat is maintained only where required, resulting in more efficient use of power.

Figure 4:
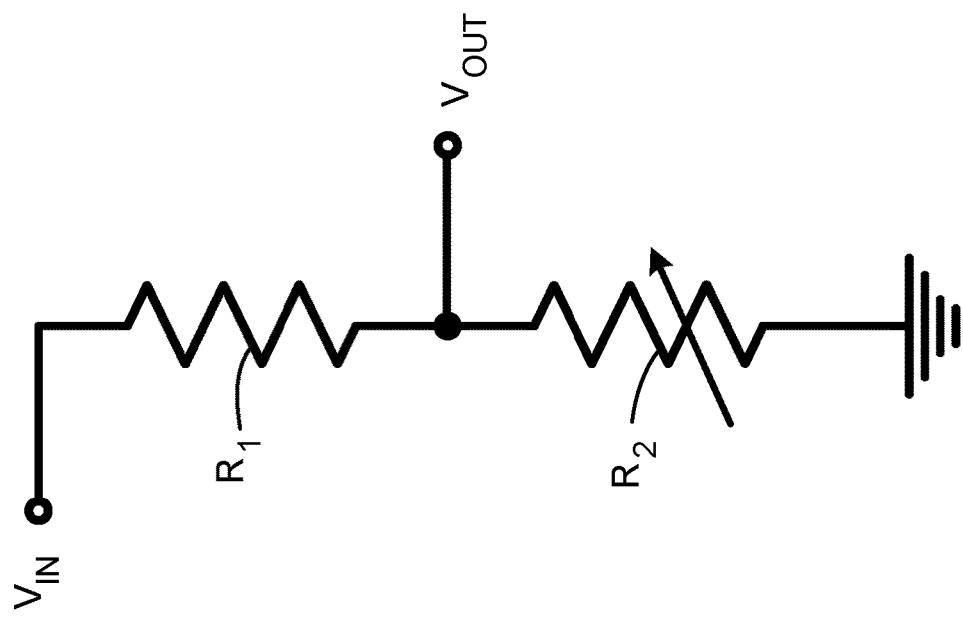
FIG. 4 is a schematic view of circuitry of the flush static plate.

FIG. 4 is a schematic view of circuitry 34 of flush static plate 10. Circuitry 34 includes input voltage $V_{IN}$, resistor $R_1$, resistor $R_2$, and output voltage $V_{OUT}$.

$R_1$ is the resistor of fixed resistance heater 24. $R_2$ is the resistor of self-regulating heater 26. Resistor $R_1$ and resistor $R_2$ are connected in series. As such, fixed resistance heater 24 and self-regulating heater 26 are electrically connected in series. Circuitry 34 of flush static plate 10 does not include a switch between resistor $R_1$ of fixed resistance heater 24 and resistor $R_2$ of self-regulating heater 26.

Fixed resistance heater 24 receives power via input voltage $V_{IN}$ provided to resistor $R_1$ as current. As such, current flows through resistor $R_1$ of fixed resistance heater 24 and then to resistor $R_2$ of self-regulating heater 26. Due to self-regulating heater 26, the combination of fixed resistance heater 24 and self-regulating heater 26 connected in series is also self-regulating. As such, circuitry 34 of flush static plate 10 is self-regulating. When flush static plate 10 increases in temperature, the total resistance of fixed resistance heater 24 and self-regulating heater 26 increases, decreasing the current, which decreases power consumption. When flush static plate 10 decreases in temperature, the total resistance of fixed resistance heater 24 and self-regulating heater 26 decreases to increase the current, which increases power and provides heat needed to maintain deicing and anti-icing capabilities in cold environments. Output voltage $V_{OUT}$ is a voltage that allows for monitoring of self-regulating heater 26 if desired.

Maximum power consumption of fixed resistance heater 24 and self-regulating heater 26 is limited by self-regulating heater 26, which utilizes the automatic shut-off, as described above with respect to FIGS. 2 and 3, and chokes the power draw at a set-point temperature. When the aircraft is in flight and conditions are highly convective, the set-point temperature is generally not reached. When the aircraft is grounded and conditions are in a steady state, the set-point temperature may be reached and exceeded to increase resistance and choke the power output.

Fixed resistance heater 24 receives the most heat and draws the most power, upon power-up, allowing for bake out of ports 20, as discussed above with respect to FIGS. 2 and 3. Fixed resistance heater 24 is more prone to rapid power-up due to its relatively small sized compared to self-regulating heater 26, which is larger and less prone to larger thermal shifts. As self-regulating heater 26 heats up, the total resistance of fixed resistance heater 24 and self-regulating heater 26 increases to decrease the amount of power consumed. As such, no active control by software or other electromechanical means is necessary to regulate fixed resistance heater 24 and self-regulating heater 26.

Because circuitry 34 passively controls the amount of power consumed by fixed resistance heater 24 and self-regulating heater 26, circuitry 34 does not include a switch, such as a mechanical or thermal switch, which would require additional circuitry and could result in increased development lead times and reduced reliability. Additionally, designs with active control may get too hot when the aircraft is grounded if the heaters are not turned off. Thus, flush static plate 10 is less complex, less prone to failure, more reliable, and has reduced associated lead time and technical risk.

Self-regulating heater 26 connected in series with fixed resistance heater 24 prevents excessive power consumption and burn-out of fixed resistance heater 24 and self-regulating heater 26 via the automatic shut-off. Further, flush static plate 10 uses power more efficiently and is more cost-effective.

Mounts 28, inner annular gap 30, and outer annular gap 32, together with fixed resistance heater 24 and self-regulating heater 26 connected in series, achieves improved management of heat for optimal de-icing, anti-icing, and moisture management while reducing system complexity and cost and increasing reliability.

Figure 5:
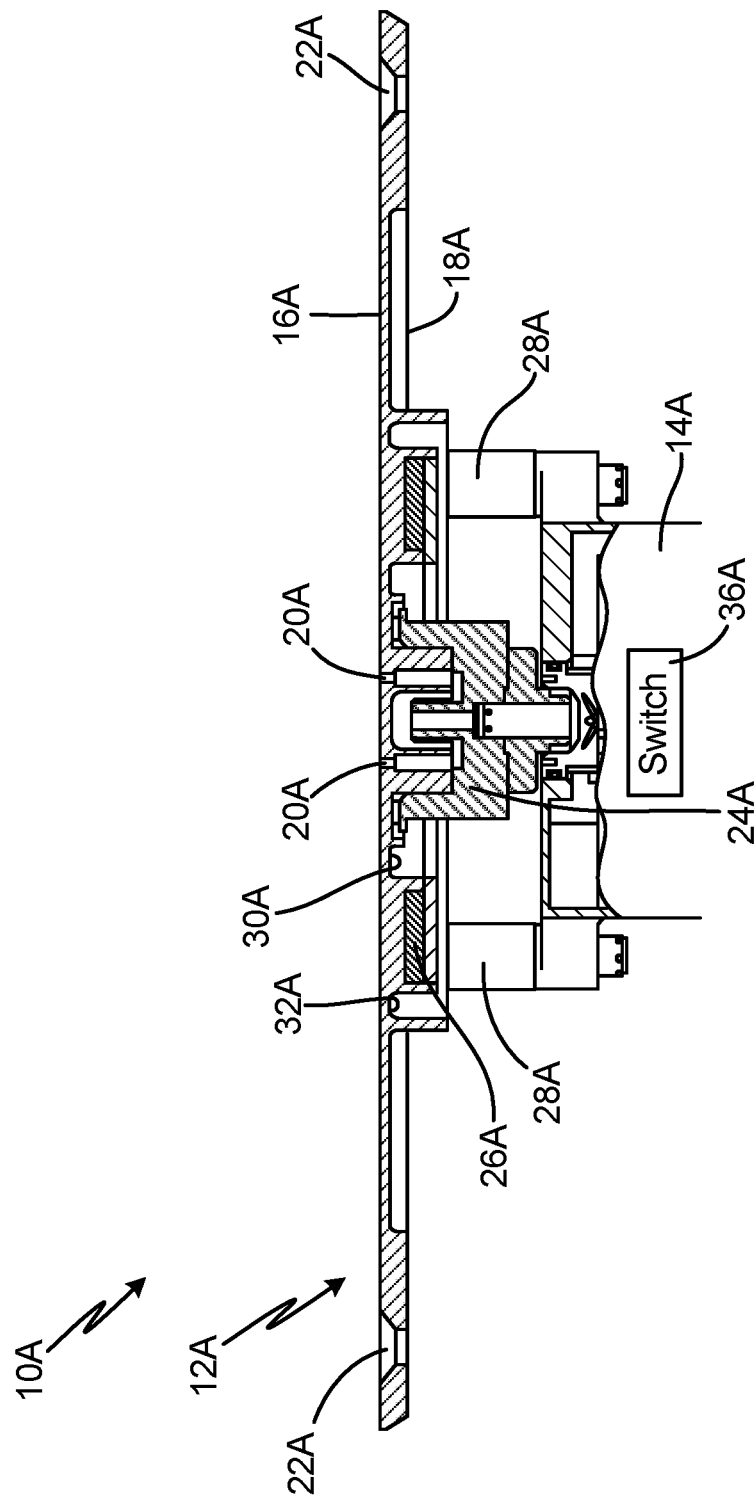
FIG. 5 is a partial cross-sectional side view of a second embodiment of a flush static plate including a switch.

FIG. 5 is a partial cross-sectional side view of flush static plate 10A including switch 36A. FIG. 6 is a schematic view of circuitry 34A of flush static plate 10A. FIGS. 5 and 6 will be discussed together. Flush static plate 10A includes faceplate 12A, housing 14A, fixed resistance heater 24A, self-regulating heater 26A, switch 36A, and circuitry 34A. Circuitry 34A includes input voltage $V_{INA}$, resistor $R_{1A}$, resistor $R_{1B}$, and resistor $R_{2A}$.

Flush static plate 10A has generally the same structure and function as flush static plate 10 described with respect to FIGS. 1-4. However, flush static plate 10A includes switch 36A. Switch 36A is positioned within housing 14A. In alternate embodiments, switch 36A may be positioned in any suitable housing or area of flush static plate 10A. Switch 36A may be a thermal switch, an electronically-controlled switch, or any other suitable switch.

$R_{1A}$ and $R_{1B}$ are the resistors of fixed resistance heater 24A. $R_{2A}$ is the resistor of self-regulating heater 26A. Switch 36A is between resistors $R_{1A}$ and $R_{1B}$ and between resistors $R_{1A}$ and $R_{2A}$. As such, switch 36A is between fixed resistance heater 24A and self-regulating heater 26A. Resistors $R_{1A}$ and $R_{1B}$ are connected in series when switch 36A is in a first position. Switch 36A is in a first position when circuitry 34A is unpowered. When switch 36A is in a first position, all of the current, and thus heat, is directed to fixed resistance heater 24A. As such, fixed resistance heater 24A responds rapidly at start-up and effectively achieves bake out more quickly. Resistors $R_{1A}$ and $R_{2A}$ are connected in series when switch 36A is in a second position. When switch 36A is in a second position, current is divided between fixed resistance heater 24A and self-regulating heater 26A, and fixed resistance heater 24A and self-regulating heater 26A function the same as fixed resistance heater 24 and self-regulating heater 26 described with respect to FIGS. 2-4.

While switch 36A may require active control of flush static plate 10A and introduce a decrease in reliability, switch 36A can offer some performance benefits, particularly at start-up. Additionally, when switch 36A is in the second position, flush static plate 10A can be passively controlled and achieve optimal de-icing and moisture management.

Discussion of Possible Embodiments

The following are non-exclusive descriptions of possible embodiments of the present invention.

A static plate heating arrangement includes a faceplate including a port extending from an exterior surface of the faceplate to an interior surface of the faceplate; a fixed resistance heater in thermal communication with the interior surface and surrounding the port; and a self-regulating heater in thermal communication with the interior surface and surrounding the fixed resistance heater; wherein the fixed resistance heater and the self-regulating heater are electrically connected in series.

The static plate heating arrangement of the preceding paragraph can optionally include, additionally and/or alternatively, any one or more of the following features, configurations and/or additional components:

Circuitry of the flush static plate does not include a switch between the fixed resistance heater and the self-regulating heater.

The faceplate is made of material having a thermal conductivity in the range of the thermal conductivity of titanium to the thermal conductivity of copper.

A feature positioned between the fixed resistance heater and the self-regulating heater configured to decrease heat transfer radially across the feature.

The feature is an inner annular gap that defines a decreased thickness of the faceplate where the annular gap exists.

A feature surrounding the self-regulating heater configured to decrease heat transfer radially across the feature.

The feature is an outer annular gap that defines a decreased thickness of the faceplate where the annular gap exists.

An inner annular gap extending into the faceplate from an interior surface of the faceplate; and an outer annular gap extending into the faceplate from an interior surface of the faceplate; wherein the self-regulating heater is positioned between the inner annular gap and the outer annular gap.

A mount positioned between the interior surface of the faceplate and a housing of the flush static plate, the mount being formed of a low thermal conductivity material.

The mount is formed of at least one of steel, titanium, composite, and plastic.

The mount is adjacent the self-regulating heater.

A plurality of mounts positioned between the interior surface of the faceplate and a housing, the plurality of mounts being formed of a low thermal conductivity material and being adjacent the self-regulating heater.

The port extends through a portion of the faceplate within the fixed resistance heater such that the fixed resistance heater surrounds an interior portion of the port.

A switch between the fixed resistance heater and the self-regulating heater.

The switch is one of a thermal switch and an electronically-controlled switch.

A method of heating a static plate includes positioning a fixed resistance heater to be in thermal communication with an interior surface of a faceplate of the static plate and surround a port in the faceplate; positioning a self-regulating heater to be in thermal communication with the interior surface of the faceplate and surround the fixed resistance heater; and causing current to flow through the fixed resistance heater and the self-regulating heater in series.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flush static plate heating arrangement comprising:
   a faceplate including a port extending from an exterior surface of the faceplate to an interior surface of the faceplate;
   a fixed resistance heater in thermal communication with the interior surface and surrounding the port;
   a self-regulating heater in thermal communication with the interior surface and surrounding the fixed resistance heater;
   an inner annular gap extending into the faceplate from the interior surface of the faceplate, wherein the faceplate has a decreased thickness at the inner annular gap, and wherein the inner annular gap provides thermal separation between the fixed resistance heater and the self-regulating heater; and
   an outer annular gap extending into the faceplate from the interior surface of the faceplate, wherein the faceplate has a decreased thickness at the outer annular gap to decrease radial heat transfer across the faceplate;
   wherein the fixed resistance heater and the self-regulating heater are electrically connected in series.

2. The flush static plate heating arrangement of claim 1, wherein circuitry of the flush static plate does not include a switch between the fixed resistance heater and the self-regulating heater.

3. The flush static plate heating arrangement of claim 1, wherein the faceplate is made of material having a thermal conductivity in the range of the thermal conductivity of titanium to the thermal conductivity of copper.

4. The flush static plate heating arrangement of claim 1, further comprising a mount positioned between the interior surface of the faceplate and a housing of the flush static plate, the mount being formed of a low thermal conductivity material.

5. The flush static plate heating arrangement of claim 4, wherein the mount is formed of at least one of steel, titanium, composite, and plastic.

6. The flush static plate heating arrangement of claim 4, wherein the mount is adjacent the self-regulating heater.

7. The flush static plate heating arrangement of claim 1, further comprising a plurality of mounts positioned between the interior surface of the faceplate and a housing, the plurality of mounts being formed of a low thermal conductivity material and being adjacent the self-regulating heater.

8. The flush static plate heating arrangement of claim 1, wherein the port extends through a portion of the faceplate within the fixed resistance heater such that the fixed resistance heater surrounds an interior portion of the port.

9. The flush static plate heating arrangement of claim 1, further comprising a switch between the fixed resistance heater and the self-regulating heater.

10. The flush static plate heating arrangement of claim 9, wherein the switch is one of a thermal switch and an electronically-controlled switch.

11. The flush static plate heating arrangement of claim 1, wherein the self-regulating heater is between the inner annular gap and the outer annular gap.

12. The flush static plate heating arrangement of claim 1, and further comprising:
   a plurality of mounts positioned between the interior surface of the faceplate and a housing of the flush static plate, the mount being formed of a low thermal conductivity material;
   wherein the plurality of mounts are adjacent the outer annular gap to keep the heat from the fixed resistance heater and the self-regulating heater in a center portion of the faceplate; and
   a plurality of ports extending through the center portion of the faceplate within the fixed resistance heater such that the fixed resistance heater surrounds an interior portion of the ports;
   wherein the inner annular gap and the outer annular gap reduce heat movement radially outward to keep heat produced by the fixed resistance heater and the self-regulating heater near the center portion of the flush static plate.

13. A flush static plate heating arrangement comprising:
   a faceplate including a port extending from an exterior surface of the faceplate to an interior surface of the faceplate;
   a fixed resistance heater in thermal communication with the interior surface and surrounding the port;
   a self-regulating heater in thermal communication with the interior surface and surrounding the fixed resistance heater; and
   an outer annular gap positioned around the self-regulating heater and within an outer annular rib, the outer annular gap extending into the faceplate from the interior surface of the faceplate such that the faceplate has a decreased thickness at the outer annular gap compared to the thickness of the faceplate near the self-regulating heater;
   wherein the outer annular gap decreases radial heat transfer through the faceplate; and
   wherein the fixed resistance heater and the self-regulating heater are electrically connected in series.

14. The flush static plate heating arrangement of claim 13, and further comprising:
   an inner annular gap positioned between the fixed resistance heater and the self-regulating heater, the inner annular gap extending into the faceplate from the interior surface of the faceplate such that the faceplate has a decreased thickness at the inner annular gap compared to the thickness of the faceplate near the self-regulating heater;

wherein the inner annular gap wherein the inner annular gap and the outer annular gap decrease heat transfer radially and provide thermal separation for the fixed resistance heater and the self-regulating heater.

15. A flush static plate heating arrangement comprising:
a faceplate including a port extending from an exterior surface of the faceplate to an interior surface of the faceplate near a central portion of the faceplate;
a fixed resistance heater in thermal communication with the interior surface of the faceplate and surrounding the port;
an inner annular gap surrounding the fixed resistance heater and extending into the faceplate, the inner annular gap comprising:
   a first inner annular rib adjacent to the fixed resistance heater;
   a first outer annular rib radially outward from the first inner annular rib; and
   a first thinned wall between the first inner annular rib and the first outer annular rib, wherein the first thinned wall decreases radial heat transfer through the faceplate;
a self-regulating heater in thermal communication with the interior surface and surrounding the inner annular gap and the fixed resistance heater; and
an outer annular gap surrounding the self-regulating heater and extending into the faceplate, the inner annular gap comprising:
   a second inner annular rib adjacent to the self-regulating heater;
   a second outer annular rib radially outward from the second inner annular rib; and
   a second thinned wall between the second inner annular rib and the second outer annular rib, wherein the second thinned wall decreases radial heat transfer through the faceplate;
wherein the fixed resistance heater and the self-regulating heater are electrically connected in series.

16. The flush static plate heating arrangement of claim 15, wherein the faceplate has a decreased thickness at the inner annular gap such that the interior surface of the faceplate is closer to an exterior surface of the faceplate than the fixed resistance heater at the first thinned wall, and wherein the faceplate has a decreased thickness at the outer annular gap such that the interior surface of the faceplate is closer to an exterior surface of the faceplate than the self-regulating heater at the second thinned wall.

* * * * *